Figure 1:
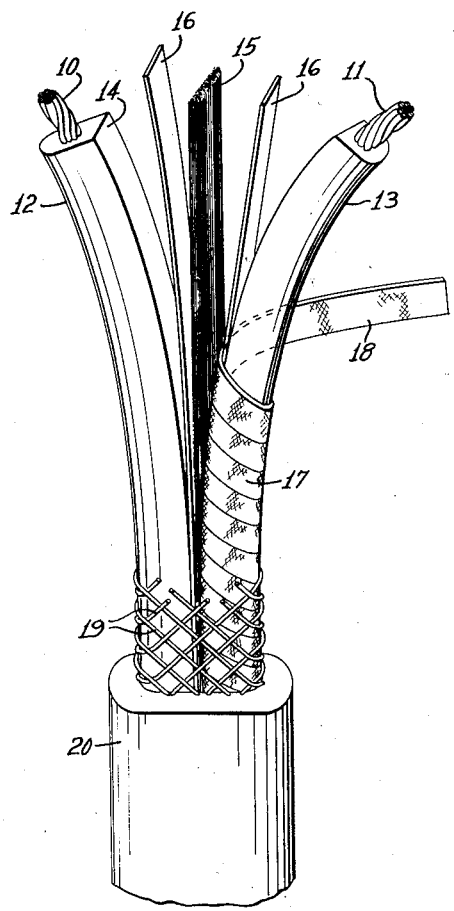

Sept. 14, 1954

C. B. PECK, JR 2,689,268

ELECTRIC POWER CABLE

Filed Oct. 7, 1950

INVENTOR
Clarence B. Peck, Jr.
BY
ATTORNEYS

UNITED STATES PATENT OFFICE 2,689,268

ELECTRIC POWER CABLE

Clarence B. Peck, Jr., Morristown, N. J., assignor to Anaconda Wire and Cable Company, a corporation of Delaware Application October 7, 1950, Serial No. 188,936

4 Claims. (Cl. 174—115)

This invention relates to insulated electric power cables, and is directed particularly to the provision of an improved cable designed to minimize the hazards of an accidental short circuit. To this end the new cable includes a ground conductor, together with a layer of electrically-conducting material surrounding at least one of the live insulated conductors and in contact with the ground conductor substantially throughout the length of the cable. Thereby the ground conductor is made a part of any short circuit that may occur through the live conductor insulation to ground, and is caused to carry enough current to energize a circuit breaker or other protective device connected to it.

The new cable is especially well suited for use in supplying power to mobile electric mining machines. Such machines often are designed so as not to require a trolley or third rail to supply the electric power by which they are operated. Instead, each machine is equipped with a flexible power cable carried on a cable reel mounted on the machine. The cable trails out behind the machine to some point in the rear where it is connected to a permanent electric power line. As the machine advances cable passes out from the cable reel, and when the machinery retreats the cable is wound back on the reel.

The cable used in such service is subjected to severe mechanical abuse. That part of the cable which trails out behind the machine lies on the floor of the mine or other working space (which often is wet), and there it is subject to being walked upon, run over by another machine, struck by falling rocks and other objects, and otherwise mishandled. Even with cable of the most rugged mechanical construction, therefore, short circuits to ground are sometimes caused by the rough treatment to which it is subjected.

A ground conductor (for grounding the frame of the mining machine) is often incorporated in mining machine power cables, and as a safeguard against accidental short circuits the ground conductor frequently is connected to a relay coil or to the actuating coil of a circuit breaker for breaking the circuit through the cable when the current passing through the ground conductor exceeds a predetermined safe maximum. (In some cases, as when direct current is used and one of the main conductors is itself grounded, the ground conductor serves merely to energize the circuit breaker whenever a short causes any current at all to pass through it.) Such an arrangement provides effective protection against damage due to a short circuit if the short from the live conductor to ground involves the ground conductor. If, however, the short circuit is directly from the live conductor to ground without involving the ground conductor (as may occur when the live conductor insulation is damaged on the side away from the ground conductor), then the protective devices are not caused to operate and considerable damage may result.

The present invention provides an improved power cable in which the ground conductor is necessarily involved whenever and wherever the insulation is damaged enough to cause a short circuit. The new cable comprises two or more conductors each surrounded by a layer of insulation, and together enclosed within a jacket of rubber or other material. A ground conductor is laid between the insulated conductors and extends throughout the length of the cable. Additionally, a fabric breaker strip is advantageously positioned between each insulated conductor and the ground conductor to lend further mechanical strength to the cable. A layer of electrically-conducting material surrounds at least one of the insulated conductors and is arranged to be in contact with the ground conductor substantially throughout the length of the cable. The electrically-conducting material advantageously is a tape of fabric or other fibrous material that has been sufficiently impregnated with finely divided carbon or metal powder or has otherwise been treated to render it semiconducting; and it is most advantageously incorporated in the cable by wrapping it helically about the insulated conductor (and the adjacent breaker strip if such be used) so that in the assembled cable it surrounds the insulated conductor and lies in contact with the ground conductor throughout the length of the cable. Such wrapping may surround only the insulated live conductor, so that in the completed cable to its outer surface lies in contact with the ground conductor; or alternatively the wrapping may surround both the insulated live conductor and the ground conductor, so that in the completed cable its inner surface lies in contact with the ground conductor.

In the new cable, if the insulation of the live conductor is damaged on the side away from the ground conductor sufficiently to cause a short circuit, the electrically-conducting layer on the outside of the insulation carries at least a part of the short circuit current to the ground conductor, thereby insuring operation of any protective devices to which the ground conductor is connected.

Figure 2:
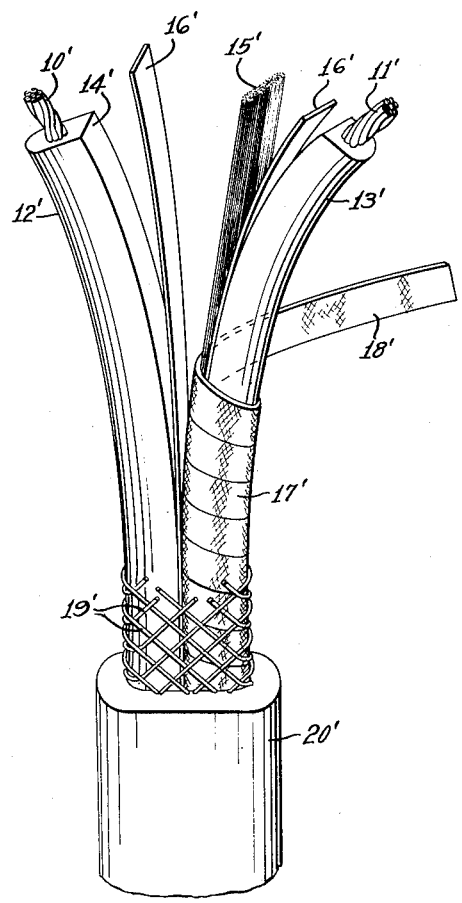

Two embodiments of the invention in two-conductor cables for supplying direct current to mining machines or other apparatus and involving the foregoing features of the invention are described below with reference to the accompanying drawings, in which Fig. 1 is a cut-away perspective showing the construction of a cable made in accordance with the invention, and Fig. 2 is a view similar to Fig. 1 showing a modified construction according to the invention.

The cable shown in Fig. 1 of the drawings comprises two stranded metallic main conductors 10 and 11, each encased in an individual layer of insulation 12 and 13, respectively. The layers of insulation are D-shaped in cross section with their flat faces 14 adjacent and facing toward each other. A flattened ground conductor 15, advantageously comprising a plurality of longitudinally extending core wires which are stranded or braided together, extends the length of the cable between the insulated conductors. Breaker strips 16, preferably made of rubber-impregnated fabric, also extend the length of the cable, one between each insulated conductor and the centrally disposed ground conductor.

A layer 17 of electrically-conducting material surrounds both the insulation 13 about one of the main conductors 11 and the adjacent breaker strip 16, and makes contact with the ground conductor 15 substantially throughout its length. Advantageously the layer 17 consists essentially of a fabric tape 18 which has been impregnated with sufficient finely divided carbon or metal powder, or has been otherwise treated, to render it semi-conducting (i. e. to make it a rather high-resistance electrical conductor), and which has been wrapped helically about the insulated conductor 11 and the adjacent breaker strip 16 so that it both surrounds the insulation 13 applied to the conductor 11 and makes contact with the ground conductor 15 throughout the length of the cable. Instead of a fabric tape 18 of the character just described, the layer 17 may comprise some other electrically-conducting material, such as carbon-impregnated paper, a thin layer of electrically-conducting rubber, foil-covered paper or fabric, or even a braid of thin wires.

For convenience in manufacturing the cable, the assembly as above described is generally bound together by a fibrous webbing of binding threads 19. Such webbing serves to hold the components of the assembly in their proper relative positions prior to extruding, or otherwise forming about them, an outer protective rubber jacket 20. This jacket permanently holds the assembly together.

The above-described cable, which has but one of the insulated conductors 11 surrounded by the conducting layer 17, is intended primarily for direct current service in which it is normal practice to have the other conductor 10 (which is not surrounded by any conducting layer) grounded when the cable is in use. If both of the insulated conductors are intended to be live conductors in use, then each of them may be surrounded by an individual wrapping of semi-conducting tape or other layer of electrically-conducting material which is in contact with the ground conductor throughout the length of the cable. Also, the invention is not limited to a cable having but two main conductors 10; it may instead have any desired number of main conductors, and any one or more of them may be surrounded by a conducting layer corresponding to the layer 17 of the cable shown in the drawings.

While the layers of insulation 12 and 13 are shown as being D-shaped in cross section, and while such shape is in fact preferred, it is obvious that they may have the more conventional circular cross section without in any way departing from the scope of the invention.

The modified form of cable shown in Fig. 2 of the drawings embodies the same structural elements as the cable shown in Fig. 1, and similar reference numerals (but primed) are applied to them. The difference between the two constructions resides in the fact that in the cable of Fig. 2 the layer 17' of electrically-conducting material surrounds both one of the insulated conductors 11' and the ground conductor 15'. Thus in the modified construction the conducting tape 18' binds the ground conductor to the one of the insulated conductors which it surrounds, so that it is the inner surface of layer 17' that makes contact with the ground conductor 15'; whereas in the construction of Fig. 1 it is the outer surface of the layer 17 that makes contact with the ground conductor.

If during use either of the above-described cables suffer any damage sufficient to cause a short circuit to ground, the layer of electrically-conducting material surrounding the insulated live conductor insures that the short circuit current will in part at least flow to ground through the ground conductor. Thereby such current will actuate any safety devices that are connected to the ground conductor to interrupt the power supply in the event of a short circuit, and so will minimize the damage due to the short circuit. Except for the layer of electrically-conducting material 17 (or 17'), it would be possible for a short circuit (caused, for example, by a blow on the curved outer edge of the cable opposite the centrally disposed ground conductor) to be made to ground without involving the ground conductor and so without actuating any such safety devices.

I claim:

1. An electric cable comprising a pair of conductors each of which is surrounded by a layer of insulation that is substantially D-shaped in cross section, said insulated conductors being assembled together with the flats of the insulation layers facing each other, a flattened ground conductor positioned between said flats, a breaker strip between the flat of each layer of insulation and the ground conductor, a layer of semi-conducting material surrounding one only of the pair of insulated conductors and the adjacent breaker strip and in contact with the ground conductor throughout the length of the cable, and a jacket of insulating material enclosing the assembly of conductors.

2. An electric cable comprising a plurality of conductors each surrounded by a layer of insulation, a ground conductor positioned between said insulated conductors, a layer of electrically-conducting material surrounding at least one but less than all of said insulated conductors and the ground conductor and in contact with said ground conductor substantially throughout the length of the cable, and means holding the assembly of conductors together.

3. An electric cable comprising a plurality of conductors each surrounded by a layer of insulation, a ground conductor positioned between said insulated conductors, a breaker strip between each insulated conductor and the ground conductor, a tape of semi-conducting material spirally wrapped about one only of said insulated conductors and the adjacent breaker strip and the ground conductor, said tape being in contact with the ground conductor throughout the length of the cable, and a jacket of insulating material enclosing the assembly of conductors.

4. An electric cable comprising a pair of conductors each of which is surrounded by a layer of insulation that is substantially D-shaped in cross section, said insulated conductors being assembled together with the flats of the layers of insulation facing each other, a ground conductor between said flats, a layer of semi-conducting material surrounding one only of the pair of insulated conductors and the ground conductor, said layer being in contact with the ground conductor throughout the length of the cable, and a jacket of insulating material enclosing the assembly of conductors.

References Cited in the file of this patent

UNITED STATES PATENTS

| Number | Name | Date |
| --- | --- | --- |
| 1,747,214 | Bennett | Feb. 18, 1930 |
| 1,950,182 | Kirch | Mar. 6, 1934 |
| 1,977,787 | Wodtke | Oct. 23, 1934 |
| 2,446,387 | Peterson | Aug. 3, 1948 |
| 2,455,773 | Johnson | Dec. 7, 1948 |

FOREIGN PATENTS

| Number | Country | Date |
| --- | --- | --- |
| 394,186 | Great Britain | July 13, 1933 |